United States Patent Office 3,773,726
Patented Nov. 20, 1973

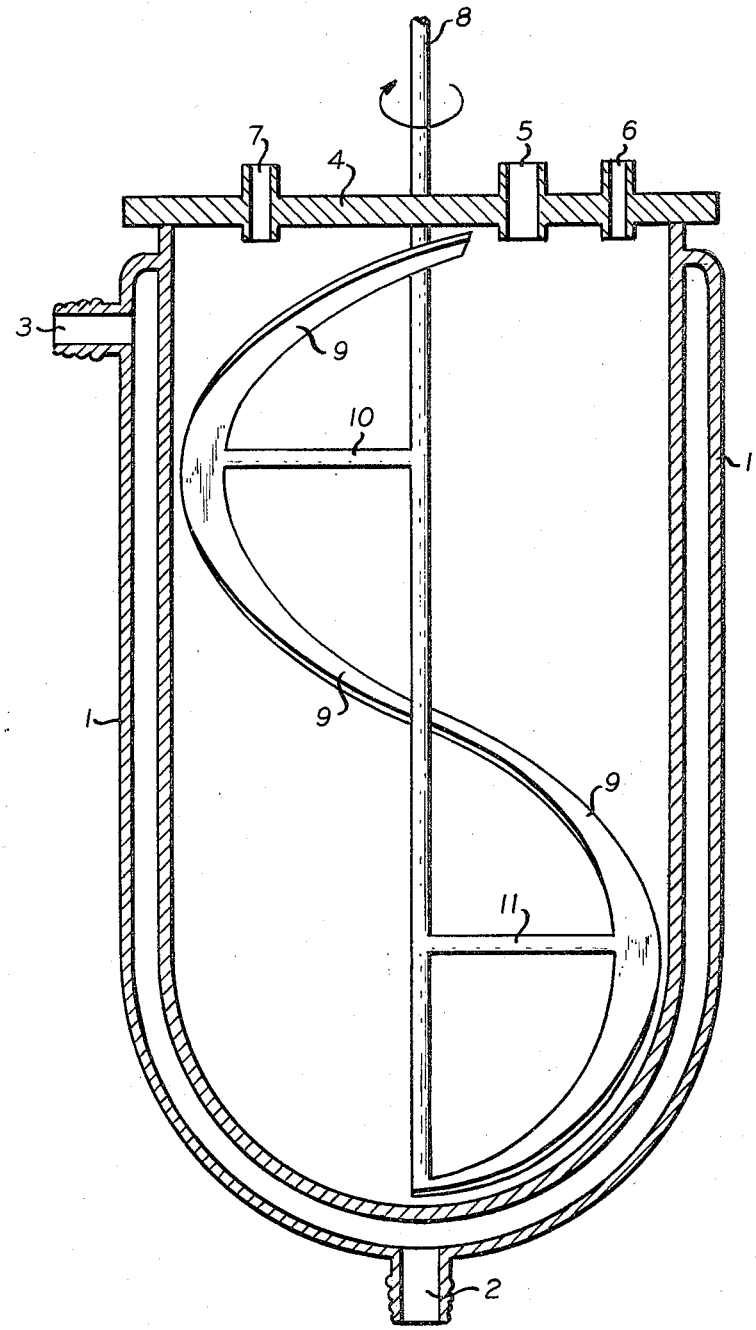

3,773,726
METHOD FOR POLYMERIZING ALPHA, ALPHA-DIALKYL-BETA-PROPIOLACTONES IN POWDER FORM
Norbert Vollkommer and Herbert Klinkenberg, Troisdorf, Werner Trautvetter, Troisdorf-Spich, and Robert Büning, Troisdorf-Sieglar, Germany, assignors to Dynamit Nobel AG, Troisdorf, Germany
Filed July 7, 1971, Ser. No. 160,569
Claims priority, application Germany, July 11, 1970, P 20 34 560.2
Int. Cl. C08g 17/17
U.S. Cl. 260—78.3 R          11 Claims

ABSTRACT OF THE DISCLOSURE

Polyesters in powder form are prepared by mass polymerization of beta-propiolactones utilizing intensive mixing to prevent agglomeration of the polymers and promote the formation of uniform particles. The mixing is best accomplished using a helical band stirrer that rotates in close proximity to the reactor wall.

BACKGROUND

This invention relates to the production of polymers in powder form by polymerization and co-polymerization of alpha, alpha-dialkyl-beta-propiolactones, particularly alpha, alpha-dimethyl-beta-propiolactone (pivalolactone).

Alpha, alpha-dialkyl-beta-propiolactones can be polymerized in the presence of ionic (both cationic and anionic) initiators, by opening the rings to form linear polyesters. The anionic initiators achieve higher molecular weights and of these, the tertiary amines and phosphines, as well as the quaternary ammonium or phosphonium compounds, have gained considerable importance.

Of equal importance is the manner in which the polymerization is effected. Among those used are the substance, precipitation and suspension polymerization methods.

Suspension polymerization methods use, as a dispersing agent for the monomer, high-boiling paraffin oils or perfluorinated hydrocarbons. Other dispersing agents not miscible with the monomeric lactone at the polymerization temperature (ca. 50–100° C.) and not interfering with polymerization so far have not been found. While a granular polymerizate is obtained, the apparent weight is too low (0.1 to 0.3 g./cc.). Large quantities of dispersing agent must be employed to insure thorough mixing (ratio of dispersing agent: lactone=3:1 to 2:1). Moreover, the paraffin oils and protective colloids are not easily volatilized and are very hard to wash out.

Precipitation polymerization methods use monomers dissolved in aliphatic hydrocarbons among others. The drawbacks here are low apparent weights (ca. 0.1 g./cc.) and high proportions of precipitant (10:1 to 15:1), which considerably reduce molecular weights and especially turnovers.

While apparent densities up to 0.3 g./cc. and proportions of precipitants of 2:1 are possible with a suspended high-molecular initiator on which the polypivalolactone "grows" (British Patent 1,133,294), this initiator has to be prepared in a separate preliminary stage from phosphines or amines and monomeric lactones.

Substance or mass polymerization has the character of a precipitation polymerization since polypivalolactone and its homologues are insoluble in their own monomer. However, the precipitating polyester particles polymerize together, resulting in an undesirable partly compact, partly porous, extremely hard and tenacious polyester block. At high rates of polymerization the heat of polymerization (about 20 Kcal./mol) causes a localization of heat which leads to a violent polymerization process, the temperature rising up to the boiling point of the monomer (152° C.).

Larger monomer charges always require thorough mixing, yet conventional stirrers cannot prevent agglomeration in the terminal phase of the polymerization (after 50 to 60% conversion.

Attempts to remedy this drawback by the use of screw extruders, plunger pumps or geared pumps as well as with wiper blades in the reactors in which the polymer is discharged in liquid form from the reaction space give only low molar weights up to 60,000, and maximally up to 100,000.

SUMMARY

The present invention makes it possible, on the other hand, to obtain with considerably smaller technical expenditure in larger space-time yield alpha, alpha-dialkyl-beta-propiolactones polymers in perfect grain form with higher molecular weight by polymerization in substance. This is achieved by a reaction vessel with a unique stirrer.

The invention comprises a method for making polyesters in powder form by polymerization or copolymerization of alpha, alpha-dialkyl-substituted beta-propiolactones by substance polymerization methods in the presence of an initiator by means of stirrers that consist of edge-touching, full-width stirrer elements fastened on a shaft by means of struts with intervening spaces existing between the shaft and stirrer elements. In operation, the stirrer element should slide along the reactor wall at a maximum distance of 15 mm.

DESCRIPTION

In the attached drawing a reactor is shown as may be employed for the purpose of the invention.

Therein 1 means the reactor wall, here with a heating chamber on its outside; 2 and 3 means outlet and inlet of an heating medium; 4 means a plane lid and 5, 6 and 7 lead-throughs, by which reactants and inert gases are brought into the reactor; 8 means the shaft of a stirrer, 9 an helical wound metal band, describing an helix with screw direction opposite the rotation direction of the shaft and 10 and 11 are struts for fastening the helical stirrer elements to the shaft.

The kind and form of reactor vessel used for this purpose is not critical. A preferred reactor is a cylindrical vessel with smooth inner surfaces. Thus, horizontal or upright flasks, vessels and cylinders may be used. The ends may be designed as plane lids, but in the case of an upright reactor, the bottom is preferably made hemispherical so that the full-width stirrer fits snugly.

The lids seal the vessel gas-tight and may contain lead-throughs for feeding and removing inert gas, the addition of monomers and initiator as well as the leading through of the stirrer shaft or spindle.

The diameter to height ratio of the cylindrical reaction vessel may be in the range of 2:1 and 1:4, but preferably between 1:1.5 and 1:3. The reactor is heated from the outside either electrically or by a heated thermal transfer liquid.

The full-width stirrer per se can be of any shape or form, e.g., in a horizontal reactor it can be a gate paddle stirrer adapted full-width to the vessel.

Preferred is a full-width stirrer that consists of a narrow metal band helically wound about the spindle of the stirrer conformed full-width to the form of the reactor. The metal band reaches from the bottom up to closely below the lid of the reactor and is fastened at the lower end of the spindle and in the central and/or upper portion is joined by one or several struts with the spindle of the stirrer.

Preferred is a helically wound metal band which upon rising in the direction of rotation describes a helix with screw direction opposite the rotation of the spindle.

Preferably, the metal band of the stirrer describes over its total length one quarter to three, preferably one half to one and one-half turns.

The metal band, viewed from the top, describes a helix with counterclockwise rotation, while the spindle driven by a motor rotates with clockwise rotation. As a result, a crane effect occurs during operation such that the reactor contents in range of the edge zone of the reaction vessel are conveyed upwards and at the center of the reaction vessel fall freely downwards. As a consequence, an effective mixing of the charge is achieved without exercising any appreciable mechanical pressure.

It has been found that an intervening space of about 1 mm. to maximally 15 mm. between the edge of the stirrer and the walls of the vessel during polymerization prevents polymer from depositing on the walls of the vessel.

The struts between metal band and stirrer spindle form a mechanical reinforcement of the band stirrer and also improve the mixing of the charge.

The full-width stirrers achieve a uniform, vigorous mixing up to the terminal phase of the polymerization and prevent the formation of agglomerations which is aided when monomer residues moisten the granular polymer.

Although the method of this invention simplifies the substance polymerization of alpha-disubstituted beta-lactones, it is also possible to polymerize monomers in the presence of any desired amounts of solvents or thinners for the monomers and to carry out the polymerization as precipitation polymerization, amounts of solvent or thinner up to the amount by weight of the monomer being preferred.

The preferred use of the method of the invention as substance polymerization enables the greatest utilization of its advantages as compared to the precipitation and suspension polymerization.

The handling of large amounts of precipitation or suspension means is thus dispensed with as are complicated washing processes for the polylactones for removal of the often quantitatively hard to remove precipitation and suspension means.

The higher rates of polymerization and conversion with the mass polymerization are of an economical advantage.

The apparent density of the polymer grit obtained is 0.35 to 0.6 g./cc. which is considerably improved as against known methods of the precipitation polymerization. This facilitates further processing.

Compared to known methods of mass polymerization, the method according to the invention has the advantage that the polymerization takes place under mild conditions and that simple apparatus serve the purpose. Since the temperature of polymerization lies as a rule between 50 and 120° C. and thus below the boiling temperature of pivalolactone (152° C.), operating under pressure or measures for recycling escaping monomers can be dispensed with. An important advantage of the method according to the invention lies in being able to carry out substance polymerization in large units at a controlled polymerization process. The effective dissipation of the heat of polymerization made possible by the intensive mixing of the charge ensures good temperature control during the entire polymerization process, whereas with uncontrolled polymerization process in block and substance polymerization with conventional stirrers the temperature during the polymerization process rises rapidly. (Comparative Example A).

Polylactones obtained by the method according to the invention differ in several aspects from products as obtained by uncontrolled block polymerization (Comparative Example A).

According to the invention, there are obtained for the first time by mass polymerization granular polylactones which, in addition, are present in uniform, easy-to-process grain form.

The grain sizes lie in the range between 0.1 and 1.0 mm. The molecular weights of the polyesters with the method according to the invention are considerably higher and possess a closer molecular weight distribution as against known methods of mass polymerization. Molecular weights of 250,000 and higher are obtained.

In particular, the thermal stability of the products as against known polylactones is substantially increased: both the loss of weight under nitrogen in the melt at 270° C. and the molecular weight degradation under air in the presence of an antioxidant at the same temperature are considerably smaller. Furthermore, there are distinct differences in the crystallinity of the polylactones obtained. The product obtained by the method according to the invention shows a higher proportion in crystalline material than the polyester from the comparative examples.

The starting materials for the polymerization per se can be any alpha, alpha-dialkyl-beta-propiolactones. Those with identical or different alkyl groups with 1 to 8 carbon atoms are preferred, and of these especially the dimethyl compound (pivalolactone) and the diethyl compound. The copolymerization of several of these lactones is possible. Likewise, the copolymerization with further cyclic monomers, especially lactones, preferred in amounts up to 25% by weight of the entire monomer, is possible.

The polymerization can be started with any of the initiators suited for the beta-lactone polymerization. Especially suited initiators are alcoholates, silanolates, amines, phosphines, phosphorous amides and phosphoric amides as well as ammonium and phosphonium compounds, e.g., phosphorous-tris-dialkylamides, phosphoric-tris-dialkylamides, the tris-(dialkylamido)-aralkyl-phosphonium halides and alkali silanolates. The initiators are preferably introduced in the form of solutions or suspensions into the reactor charged with the monomer and possibly additives for regulating the molar weight and stabilizing the polymerizate.

The initiator concentration can lie in the range between 0.1 and 0.0001 mol percent, relative to the monomer, and the polymerization temperature can be between 0 and 200, preferably between 50 and 120° C.

The polymerization times fluctuate between several minutes and several hours. The yields are above 90%, as a rule around 95%. The residual monomer can be readily removed or recovered by temperature arrangement of the polyester, preferably under vacuum. With certain initiators, an after-treatment of the polymerizate for its removal is not necessary and the polyester can, after addition of stabilizers and/or processing aids if desired, be processed directly. When using the aforementioned band stirrer the following should be noted:

Width and thickness of the helically wound metal band should be conformed to the volume content of the reaction vessel. The band stirrer should have an adequate working surface in order to be able to vigorously mix the reaction material. It must not, however, be of too large a surface so that near the end of the polymerization, when the polyester is present in the form of powder, a thorough mixing is possible. With a reaction vessel of 1 liter volume the metal band has preferably a width of 4 to 7 mm. and a thickness of 1 to 3 mm., the struts having about the same thickness. With a reaction vessel of 100 liters content the metal band has preferably a width of 20 to 40 mm. and a thickness of 2 to 6 mm.

Similar conditions hold true for the other full-width stirrers.

The speeds of the stirrer and the path speeds of the rotating metal band (cm./sec.) are a function of the reactor form (ratio of diameter to height), stage of polymerization. The following recommended values for the path speed apply, for example, to reactors with a ratio diameter to height in the range of 1:1.7 to 1:2.5. Since optimal speeds of the stirrer will also depend upon the reactor volume, the following speed ranges apply for 1-liter reactors. The data for reactors of 50 to 100 l. content are put in parentheses.

At the start of the polymerization a liquid system exists and the path speed of the stirrer should lie between 50 and 100 cm./sec. and numbers of rotation of 80–200 (20–70) revolutions/minute. When 20 to 30% conversions are reached an easily movable suspension of the polymer in the monomer exists, and the path speed should be increased to 150 to 200 cm./sec., the numbers of rotation to 250–400 (60–140) r.p.m. When 50 to 60% conversion is achieved the solid, residual monomer-swelled and moistened phase constitutes already the main portion in the reactor and the danger of coagulation is then the greatest. Agglomerate formation is prevented by path speeds of 250–350 cm./sec., at speeds of the stirrer of 400–700 (100–250) r.p.m. At about 80–85% conversion the reactor content appears on the outside to look like a "dry" polymer powder. The frictional resistance has increased so that to protect the apparatus the path speed should be reduced to 100–150 cm./sec., the number of rotations to 150–300 (40–100) r.p.m. This can be done without any risk because coagulation of the charge will not take place until about 95% conversion has been reached.

The speed of the stirrer should be increased with increasing rates of polymerization, although the speed of the stirrer can be freely regulated within a wide range. The various stages of the polymerization should preferably have the following rates of polymerization. In the first phase of the polymerization (up to about 40% conversion) wide limits of polymerization rates of between 0.5 and 10% turnover/min. are possible, but should not fall below this value. Higher rates of polymerization may impede the heat dissipation. In the second phase of the polymerization (40–80% conversion) the rate of polymerization should not be more than 5%/min., preferably 0.5 to 5% turnover/min. Values above 5%/min. could in spite of high speeds of the stirrer lead in this phase to agglomerations. In the last phase of the polymerization (conversion 80%) the rate of polymerization normally drops due to depletion of the monomers. The final conversion of 90 to 98% can, however, be considerably hastened by an increase of the temperature of polymerization in this phase.

The regulation of the rate of polymerization can be effected by proper choice of the initiator, by the initiator concentration and by the temperature control during the polymerization. With very active initiators it can be of advantage to vary the temperature during polymerization by means of a heating jacket or by cooling means.

In general, the reactor is filled to from 20 to 50%.

The "inherent viscosity" ($\eta$) was determined in trifluoro acetic acid (0.5 g./100 ml.). The molecular weight (M) is obtained according to the relation $$\eta\text{inh} = 3 \cdot 10^{-4} \cdot M^{0.8}$$

EXAMPLE 1

The reactor is a cylindrical, upright glass vessel of 1 liter capacity, about 9 cm. diameter and 20 cm. overall height, which at the bottom end is hemispherically sealed. The reaction vessel is sealed gas-tight with a planar lid which has openings for the feeding and removal of inert gas, for the addition of the reaction components and the lead-through of the stirrer spindle. The heating of the reactor is effected by water of a thermostat which flows through a glass jacket.

The speed of the spindle is infinitely variable. The stirrer consists of a band of 6 mm. width and 2 mm. thickness wound about the stirrer spindle and full-width conformed to the shape of the reactor. The metal band reaches from the bottom to closely beneath the lid of the reactor and describes a helix with (seen from the top) anticlockwise sense of rotation, a three-quarter turn accounting for the total length of the band. The spindle has clockwise rotation. The band is at its lower end welded to the spindle and at a level of 14 cm. joined by a strut with the spindle. The metal band has a distance of between 1 and 3 mm. from the wall of the reactor. The narrow side of the band slides over its entire length along the wall of the reactor.

The reactor is heated to 80° C. and flushed with dry nitrogen. Then, 285 g. (2.85 mol) purified dry pivalolactone are fed in. To start the polymerization, $2.47 \cdot 10^{-3}$ g. ($8.55 \cdot 10^{-6}$ mol) tris-(dimethylamido)-benzyl-phosphonium chloride dissolved in 4 ml. acetonitrile, are used. The stirrer is set for 180 r.p.m. Immediately after addition of the initiator polypivalolactone appears in form of gel-like, swelled up particles. After 3 minutes, about 20% conversion is reached and the speed is increased to 350 r.p.m. Six minutes after initiator addition, about 40% conversion is reached and the reactor content consists of polymer paste. After a total of 10 minutes polymerization time about 55% conversion is reached and the speed of the stirrer is increased to 650 r.p.m. 20 minutes after initiator addition (conversion about 80%) the reactor content gives the impression of a dry polymer powder. The speed of the stirrer is reduced to 250 r.p.m. At 90° C., agitation is continued another 2 hours, then the rest of the monomer removed in vacuum. 274 g. of granular polypivalolactone (conversion 96% by weight) of a grain size between 0.2 and 0.8 mm. are obtained. Residual monomer is removed under vacuum at 110° C. The "inherent viscosity" is 5.87 (molecular weight about 230,000) and the apparent weight 0.43 g./cc.

EXAMPLE 2

Using the same reactor and the same initiator as in Example 1 there are further added, under otherwise the same polymerization conditions, 0.02 g. of phenol as chain transferrers to the polymerization charge. The polymerization runs in the initial stage at somewhat slower speed so that for reaching a conversion of ca. 80% 35 minutes are required. 270 g. of polypivalolacetone with a grain size of between 0.2 and 0.9 mm. and an apparent density of 0.45 g./cc. are obtained. The conversion is 94.7% by weight, the "inherent viscosity" is 4.8 (molecular weight about 180,000).

Comparative Example A (block polymerization)

In a 1-liter reaction flask equipped with a paddle-blade type stirrer and return-flow cooler which dips in a heating bath heated to a temperature of 80° C. there are placed under nitrogen 320 g. (3.2 mol) of purified and dried pivalolactone and, under vigorous stirring, $2.8 \cdot 10^{-3}$ g. ($9.6 \cdot 10^{-6}$ mol) of tris-(dimethylamido)-benzyl-phosphonium chloride. The initiator concentration and polymerization temperature are the same as in Example 1. The polymerization sets in immediately. After a few minutes, a thick polymer paste has formed which increasingly solidifies so that the stirrer must be turned off. The polymerization takes an uncontrolled course: the temperature rises to the boiling temperature of the monomer which is indicated by strong return flow of the monomer in the cooler. The rate of polymerization increases to such an extent that the polymer in the reaction flask is hurled upward.

Afterwards, the reaction flask has to be smashed in order to obtain the polyester. The polypivalolactone is an inhomogeneous, partly compact, partly porous block with numerous cavities which prior to grinding down to 0.1 to 0.8 mm. must be cut up. The polypivalolactone has an "inherent viscosity" of 4.7 (molecular weight about 175,000) and thus lies clearly below the corresponding values of the product from Example 1.

Comparative Example B (suspension polymerization)

In a 1-liter round-bottom flask equipped with a paddle blade-type stirrer 150 g. (1.5 mol) of pivalolactone and 450 g. of dried paraffin oil (boiling range 240–280° C. at 0.5 mm. Hg) in which 1.35 g. of a copolymer of N-vinyl pyrrolidone (25 mol percent) and acrylic decyl ester as protective colloid are dissolved, are placed. Through vigorous stirring, the monomer is distributed in form of drops in the dispersing agent. Then the mixture is heated to 80° C. and $1.3 \cdot 10^{-3}$ g. $(4.5 \cdot 10^{-6}$ mol) tris-(dimethylamido)-benzyl-phosphonium chloride as initiator in 1.16 ml. acetonitrile added. After 3.5 hours, the polymerization is interrupted. The monomer droplets have turned into solid polyester particles of a diameter of 0.2 and 1.3 mm. The polyester is thoroughly sucked off on a glass frit, then washed four times with low-boiling petroleum ether (boiling range 40–70° C.) and subsequently dried. There are obtained 140 g. of polypivalolactone with an "inherent viscosity" of 5.3 (molecular weight about 205,000). The turnover is 93% by weight.

Stability comparison

For comparison of the thermal stability of the polypivalolactones according to the invention as given in Examples 1 and 2 with the polypivalolactones obtained by block polymerization with uncontrolled polymerization according to Comparative Example A and by suspension polymerization according to Comparative Example B the specimens are subjected to a thermogravimetric analysis: at 270° C. the loss of weight under nitrogen as a function of the time is registered. The heating up time to the testing temperature of 270° C. is 8° C./min.

| Polypivalolactone produced according to— | Weight losses at 270° C. (percent) after— | | | |
|---|---|---|---|---|
| | 0[1] min. | 30 min. | 60 min. | 120 min. |
| Example 1 in accordance with the invention | 0.1 | 1.3 | 2.1 | 2.6 |
| Example 2 in accordance with the invention | 0.2 | 1.4 | 2.3 | 2.9 |
| Comparative Example A (block polymer) | 0.4 | 3.8 | 5.1 | 6.8 |
| Comparative Example B (suspension polymer) | 1.3 | 4.0 | 6.2 | 9.7 |

[1] Weight loss during the heating up.

The increased thermal stability of the polypivalolactones prepared according to the invention is evident. The high weight loss of the suspension polymer can still be made worse by not removing paraffin oil. A brown coloration of the suspension polymer is conspicuous after 120 min.

Another criterion for the thermal stability of the polypivalolactone is the molar weight degradation under access of air in the presence of an antioxidant. The products from Example 2 (molecular weight 180,000) and from Comparative Example A (molecular weight 175,000) were stabilized with 0.2% by weight of N-phenyl-beta-naphthyl amine. At 270° C. the molecular weight degradation as a function of time under atmospheric air was observed.

| Polypivalolactone according to— | Molar weight after— | | | |
|---|---|---|---|---|
| | 0 min. | 10 min. | 20 min. | 40 min. |
| Example 2 | 180,000 | 125,000 | 105,000 | 90,000 |
| Comparative Example A | 175,000 | 95,000 | 75,000 | 60,000 |

Also, under these close to industrial processing conditions, the high thermal stability of the products according to the new method manifests itself.

Comparison of crystallinity

The crystalline proportions of the polypivalolactones according to Example 2 and according to Comparative Example A were determined by planimetry of the X-ray diffraction diagrams (counter tube-goniometer). The evaluation of the intensities of the lines gave for the polyester prepared according to the invention the high proportion of 75–80%, while in the product of the comparative examples only 60–65% crystalline material is present.

EXAMPLE 3

Into the reactor according to Example 1, 300 g. (3 mol) pivalolactone and the amount of tris-(dimethylamido)-benzyl-phosphonium chloride now increased to $4.33 \cdot 10^{-3}$ g. $(1.5 \cdot 10^{-5}$ mol) as solution in 1.5 ml. acetonitrile are introduced. The stirrer is set for 180 r.p.m. and the temperature brought to 80° C. Polymerization sets in immediately. After 3 minutes (30% conversion) the speed is increased to 380 r.p.m. To curb the rate of polymerization the reactor temperature is reduced within 4 minutes to 60° C. After 8 minutes polymerization time 60% conversion is reached and the speed of the stirrer is increased to 650 r.p.m. After 16 minutes 85% conversion is achieved, the polymerizate is present in powder form and the speed can be reduced to 300 r.p.m. The reactor temperature is increased to 90° C. and the charge maintained for a further hour under these conditions. After a total of 1¼ hours, the polymerization is interrupted and the residual monomer evaporated. Apparent density is 0.45 g./cc. "Inherent viscosity" 4.97 (molecular weight about 190,000). Yield 283 g. Turnover 94% by weight.

EXAMPLE 4

Into the reactor according to Example 1, 340 g. (3.4 mol) pivalolactone are introduced and heated to the polymerization temperature of 80° C. As initiator, 0.12 g. $(6.8 \cdot 10^{-4}$ mol) hexamethyl phosphoric triamide, dissolved in petroleum ether, are added. After 15 minutes, 20% conversion is reached and the speed of the stirrer is increased from 150 r.p.m. to 300 r.p.m. After 30 minutes of reaction time 50% conversion is reached and the speed is increased to 650 r.p.m. One hour after initiator addition a polymerizate powder exists and the speed is lowered to 250 r.p.m. For completing the conversion, the charge is kept under these conditions for a further 2 hours. 320 g. of polypivalolactone powder (conversion 94% by weight) are obtained. Apparent density 0.36 g./cc. "Inherent viscosity" 4.97 (molecular weight 190,000). The weight loss at 270° C. under nitrogen after 60 and 120 minutes is 2.0 and 2.4% respectively.

EXAMPLE 5

As the reactor, a cylindrical steel reaction vessel with 50-liter capacity curved hemispherically at the bottom is used. The diameter is 34 cm., the overall height 68 cm. The stirrer consists of a 18 mm. wide and 3 mm. thick band which at its lower end is welded to the bottom of the stirrer spindle, is led in a (seen from the top) anti-clockwise helix up to closely beneath the lid of the reactor and describes over its entire length one and one-fourth turns. The metal band is joined through 3 struts with the spindle of the stirrer and full-width adapted to the form of the vessel.

The reactor is flushed with pure nitrogen and charged with 16 kg. pivalolactone (160 mol). The stirrer is set for 50 r.p.m. After 14 g. $(4.8 \cdot 10^{-2}$ mol) of diphenyl silanediol-potassium as a solution in dioxane are added the reactor is brought to the polymerization temperature of 90° C. Polymerization sets in immediately and after 10 minutes 20% conversion is attained. The speed is increased to 100 r.p.m. After 25 minutes polymerization time (50% conversion) a viscous polymer paste has formed and the speed is increased to 180 r.p.m. The polymerization now takes place at a rate of about 3% conversion/min., so that after 35 minutes 80% polymerization has taken place. After a further hour at 100° C. residual monomer is removed. 15.4 kg. of polypivalolactone powder (conversion 96.2% by weight) are then obtained. Grain size is 0.2 to 0.6 mm. Apparent density is 0.64 g./cc. "Inherent viscosity" 4.45 (molecular weight 165,000). The weight loss at 270° C. under nitrogen is after 60 and 120 minutes 1.8 and 2.8%, respectively. A product stabilized with 0.2% N-phenyl-beta-naphthyl amine under atmospheric air at 270° C. in 10 and 40 minutes is degraded from molecular weight 165,000 to 110,000 and 80,000, respectively.

EXAMPLE 6

Using the test equipment from Example 1, 226 g. (2.26 mol) of alpha, alpha-dimethyl-beta-propiolactone (pivalolactone)) and 51 g. (0.4 mol) of alpha, alpha-diethyl-beta-propiolactone are copolymerized with each other. In the charge, 85 mol percent pivalolactone and 15 mol percent alpha, alpha-diethyl-beta-propiolactone are present. For the initiation of the polymerization, $2.10^{-3}$ g. of tris-(dimethylamido)-benzyl-phosphonium chloride are used. The polymerization temperature is 80°, after reaching about 80% conversion, 90° C.

The test procedure and course of the copolymerization do not differ from the homopolymerization in Example 1.

After a total of 120 minutes polymerization time 261 g. of copolymer with an apparent density of 0.4 g./cc. are obtained. The conversion is 94% by weight. The copolyester is highly crystalline and has, according to DTA, a melting temperature of 209° C. The "inherent viscosity" is 4.8.

What is claimed is:

1. Method for preparing polyesters in powder form by polymerization or copolymerization of an alpha, alpha-dialkyl-substituted beta-propiolactone by a bulk polymerization process in the presence of an initiator which consists essentially of intensively mixing in a cylindrical reactor during polymerization by means of full-width stirrers which consist of full-width stirrer elements fastened on a stirrer spindle by means of struts with intervening spaces between stirrer spindle and stirrer element, and the full-width stirrer element, when in operation, sliding at a distance such that the intervening space between the edge of the stirrer and the walls of the reactor is from 1 mm. to 15 mm., said stirrer element being in the form of a helix.

2. Method according to claim 1 wherein the reactor consists of a cylindrical vessel with smoothed inner surface through the ends of which the spindle of the stirrer is carried.

3. Method according to claim 1 wherein the ratio of diameter to total height of the cylindrical reactor lies between 2:1 and 1:4, preferably between 1:1.5 and 1:3.

4. Method according to claim 1 wherein the full-width stirrers consist of metal band helically wound about the stirrer spindle and full-width conformed to the shape of the reactor, which extends from the bottom to closely beneath the lid of the reactor and is fastened to the lower end of the stirrer spindle and in the central and/or upper portion joined by one or several struts with the stirrer spindle.

5. Method according to claim 4 wherein the helically wound metal band describes a helix with a screw motion opposite the sense of rotation of the spindle so that in operation of the stirrer the polymer in the area of the edge zone of the reactor is conveyed upwards and at the center of the reactor vessel falls freely downwards.

6. Method according to claim 5 wherein the metal band of the stirrer describes over its entire length one-fourth to three, preferably one-half to one and a half, turns.

7. Method according to claim 1 wherein the initiator is a phosphorous-tris-(dialkyl amide), a phosphoric-tris-(dialkyl amide), a tris-(dialkylamido)-aralkyl-phosphonium halide or an alkali silanolate.

8. Method according to claim 1 wherein the polymerization temperature lies between 0 and 200° C.

9. Method according to claim 1 wherein alpha, alpha-dialkyl-substituted beta-propiolactones are copolymerized with one another.

10. Method according to claim 1 wherein alpha, alpha-dialkyl-substituted beta-propiolactones, preferably pivalolactone, are copolymerized with other cyclic monomers.

11. Method according to claim 1 wherein solvents or thinners for the monomer are added to the polymerization mixture, preferably in amounts up to the amount by weight of the monomers used.

References Cited

UNITED STATES PATENTS

| | | | |
|---|---|---|---|
| 3,508,882 | 4/1970 | Farnell | 23—285 |
| 3,544,280 | 12/1970 | Thomas | 23—290 |
| 3,567,402 | 3/1971 | Christensen | 23—285 |

FOREIGN PATENTS

| | | | |
|---|---|---|---|
| 988,939 | 4/1965 | Great Britain | 260—78.3 |
| 1,090,780 | 11/1967 | Great Britain | 260—78.3 |
| 1,133,317 | 11/1968 | Great Gritain | 260—78.3 |

WILLIAM H. SHORT, Primary Examiner

E. A. NIELSON, Assistant Examiner

U.S. Cl. X.R.

260—95 R